(12) United States Patent
Levesque et al.

(10) Patent No.: US 8,854,019 B1
(45) Date of Patent: Oct. 7, 2014

(54) HYBRID DC/DC POWER CONVERTER WITH CHARGE-PUMP AND BUCK CONVERTER

(75) Inventors: Chris Levesque, Fountain Valley, CA (US); David Zimlich, Carlsbad, CA (US); Jean-Christophe Berchtold, Carlsbad, CA (US)

(73) Assignee: RF Micro Devices, Inc., Greensboro, NC (US)

( * ) Notice: Subject to any disclaimer, the term of this patent is extended or adjusted under 35 U.S.C. 154(b) by 815 days.

(21) Appl. No.: 12/567,318

(22) Filed: Sep. 25, 2009

Related U.S. Application Data (60) Provisional application No. 61/100,197, filed on Sep. 25, 2008.

(51) Int. Cl.
*G05F 1/563* (2006.01)

(52) U.S. Cl.
USPC ............................................. 323/266; 363/60

(58) Field of Classification Search
USPC ................................. 323/266, 282; 363/59, 60
See application file for complete search history.

(56) References Cited

U.S. PATENT DOCUMENTS

| | | |
|---|---|---|
| 3,735,289 A | 5/1973 | Bruene |
| 4,523,155 A | 6/1985 | Walczak et al. |
| 4,638,255 A | 1/1987 | Penney |
| 5,212,459 A | 5/1993 | Ueda et al. |
| 5,278,994 A | 1/1994 | Black et al. |
| 5,307,512 A | 4/1994 | Mitzlaff |
| 5,343,307 A | 8/1994 | Mizuno et al. |
| 5,404,547 A | 4/1995 | Diamantstein et al. |
| 5,432,473 A | 7/1995 | Mattila et al. |
| 5,603,106 A | 2/1997 | Toda |
| 5,642,075 A | 6/1997 | Bell |
| 5,652,547 A | 7/1997 | Mokhtar et al. |
| 5,724,004 A | 3/1998 | Reif et al. |
| 5,832,373 A | 11/1998 | Nakanishi et al. |
| 5,841,319 A | 11/1998 | Sato |
| 5,852,632 A | 12/1998 | Capici et al. |
| 5,860,080 A | 1/1999 | James et al. |
| 5,872,481 A | 2/1999 | Sevic et al. |
| 5,874,841 A | 2/1999 | Majid et al. |
| 5,920,808 A | 7/1999 | Jones et al. |
| 5,923,761 A | 7/1999 | Lodenius |
| 5,956,246 A | 9/1999 | Sequeira et al. |
| 6,064,272 A | 5/2000 | Rhee |
| 6,194,968 B1 | 2/2001 | Winslow |
| 6,229,366 B1 | 5/2001 | Balakirshnan et al. |
| 6,259,901 B1 | 7/2001 | Shinomiya et al. |
| 6,425,107 B1 | 7/2002 | Caldara et al. |
| 6,559,492 B1 | 5/2003 | Hazucha et al. |
| 6,606,483 B1 | 8/2003 | Baker et al. |

(Continued)

OTHER PUBLICATIONS

"60mA, 5.0V, Buck/Boost Charge Pump in ThinSOT-23 and ThinQFN," SBAS221F, Dec. 2001—Revised Mar. 2008, pp. 1-23, Texas Instruments Incorporated.

(Continued)

*Primary Examiner* — Jeffrey Sterrett
(74) *Attorney, Agent, or Firm* — Withrow & Terranova, P.L.L.C.

(57) ABSTRACT

A hybrid Direct Current (DC) to DC converter is disclosed for efficiently converting an input voltage from one level to another. In a preferred embodiment, a dual phase charge pump is combined with a buck converter and a switch controller to provide a converted voltage that is useable to cellular handset circuits based on power amplifier (PA) technology.

7 Claims, 8 Drawing Sheets

(56) References Cited

U.S. PATENT DOCUMENTS

| | | |
|---|---|---|
| 6,670,849 B1 | 12/2003 | Damgaard et al. |
| 6,674,789 B1 | 1/2004 | Fardoun et al. |
| 6,724,252 B2 | 4/2004 | Ngo et al. |
| 6,774,508 B2 | 8/2004 | Ballantyne et al. |
| 6,806,768 B2 | 10/2004 | Klaren et al. |
| 6,853,244 B2 | 2/2005 | Robinson et al. |
| 6,888,482 B1 | 5/2005 | Hertle |
| 6,900,697 B1 | 5/2005 | Doyle et al. |
| 6,906,590 B2 | 6/2005 | Amano |
| 6,917,188 B2 | 7/2005 | Kernahan |
| 6,937,487 B1 * | 8/2005 | Bron ............................... 363/60 |
| 6,954,623 B2 | 10/2005 | Chang et al. |
| 6,969,978 B2 | 11/2005 | Dening |
| 6,998,914 B2 | 2/2006 | Robinson |
| 7,035,069 B2 | 4/2006 | Takikawa et al. |
| 7,043,213 B2 | 5/2006 | Robinson et al. |
| 7,058,374 B2 | 6/2006 | Levesque et al. |
| 7,072,626 B2 | 7/2006 | Hadjichristos |
| 7,075,346 B1 | 7/2006 | Hariman et al. |
| 7,098,728 B1 | 8/2006 | Mei et al. |
| 7,116,949 B2 | 10/2006 | Irie et al. |
| 7,145,385 B2 | 12/2006 | Brandt et al. |
| 7,148,749 B2 | 12/2006 | Rahman et al. |
| 7,154,336 B2 | 12/2006 | Maeda |
| 7,177,607 B2 | 2/2007 | Weiss |
| 7,184,731 B2 | 2/2007 | Kim |
| 7,184,749 B2 | 2/2007 | Marsh et al. |
| 7,187,910 B2 | 3/2007 | Kim et al. |
| 7,202,734 B1 | 4/2007 | Raab |
| 7,248,111 B1 | 7/2007 | Xu et al. |
| 7,263,337 B2 | 8/2007 | Struble |
| 7,298,600 B2 | 11/2007 | Takikawa et al. |
| 7,299,015 B2 | 11/2007 | Iwamiya et al. |
| 7,324,787 B2 | 1/2008 | Kurakami et al. |
| 7,333,564 B2 | 2/2008 | Sugiyama et al. |
| 7,333,778 B2 | 2/2008 | Pehlke et al. |
| 7,342,455 B2 | 3/2008 | Behzad et al. |
| 7,358,807 B2 | 4/2008 | Scuderi et al. |
| 7,368,985 B2 | 5/2008 | Kusunoki |
| 7,372,333 B2 | 5/2008 | Abedinpour et al. |
| 7,408,330 B2 * | 8/2008 | Zhao .............................. 323/266 |
| 7,477,106 B2 | 1/2009 | Van Bezooijen et al. |
| 7,483,678 B2 | 1/2009 | Rozenblit et al. |
| 7,518,448 B1 | 4/2009 | Blair et al. |
| 7,529,523 B1 | 5/2009 | Young et al. |
| 7,539,462 B2 | 5/2009 | Peckham et al. |
| 7,551,688 B2 | 6/2009 | Matero et al. |
| 7,554,407 B2 | 6/2009 | Hau et al. |
| 7,558,539 B2 | 7/2009 | Huynh et al. |
| 7,580,443 B2 | 8/2009 | Uemura et al. |
| 7,622,900 B2 * | 11/2009 | Komiya ....................... 323/266 |
| 7,664,520 B2 | 2/2010 | Gu |
| 7,667,987 B2 | 2/2010 | Huynh et al. |
| 7,684,220 B2 | 3/2010 | Fang et al. |
| 7,689,182 B1 | 3/2010 | Bosley et al. |
| 7,701,290 B2 | 4/2010 | Liu |
| 7,702,300 B1 | 4/2010 | McCune |
| 7,714,546 B2 * | 5/2010 | Kimura et al. ................ 323/222 |
| 7,724,097 B2 | 5/2010 | Carley et al. |
| 7,768,354 B2 | 8/2010 | Matsuda et al. |
| 7,782,141 B2 | 8/2010 | Witmer et al. |
| 7,783,272 B2 | 8/2010 | Magnusen |
| 7,787,570 B2 | 8/2010 | Rozenblit et al. |
| 7,796,410 B2 | 9/2010 | Takayanagi et al. |
| 7,859,511 B2 | 12/2010 | Shen et al. |
| 7,860,466 B2 | 12/2010 | Woo et al. |
| 7,876,159 B2 | 1/2011 | Wang et al. |
| 7,907,430 B2 * | 3/2011 | Kularatna et al. ............. 363/59 |
| 7,941,110 B2 | 5/2011 | Gonzalez |
| 7,999,484 B2 | 8/2011 | Jurngwirth et al. |
| 8,000,117 B2 * | 8/2011 | Petricek ......................... 363/60 |
| 8,031,003 B2 | 10/2011 | Dishop |
| 8,085,106 B2 | 12/2011 | Huda et al. |
| 8,089,323 B2 | 1/2012 | Tarng et al. |
| 8,098,093 B1 | 1/2012 | Li |
| 8,131,234 B2 | 3/2012 | Liang et al. |
| 8,134,410 B1 | 3/2012 | Zortea |
| 8,149,050 B2 | 4/2012 | Cabanillas |
| 8,149,061 B2 | 4/2012 | Schuurmans |
| 8,213,888 B2 | 7/2012 | Kuriyama et al. |
| 8,228,122 B1 | 7/2012 | Yuen et al. |
| 8,258,875 B1 | 9/2012 | Smith et al. |
| 8,461,921 B2 | 6/2013 | Pletcher et al. |
| 8,514,025 B2 | 8/2013 | Lesso |
| 2002/0055376 A1 | 5/2002 | Norimatsu |
| 2002/0055378 A1 | 5/2002 | Imel et al. |
| 2003/0006845 A1 | 1/2003 | Lopez et al. |
| 2003/0042885 A1 | 3/2003 | Zhou et al. |
| 2003/0073418 A1 | 4/2003 | Dening et al. |
| 2003/0087626 A1 | 5/2003 | Prikhodko et al. |
| 2003/0201674 A1 | 10/2003 | Droppo et al. |
| 2003/0201834 A1 | 10/2003 | Pehlke |
| 2003/0227280 A1 | 12/2003 | Vinciarelli |
| 2004/0068673 A1 | 4/2004 | Espinoza-Ibarra et al. |
| 2004/0095118 A1 | 5/2004 | Kernahan |
| 2004/0127173 A1 | 7/2004 | Leizerovich |
| 2004/0183507 A1 | 9/2004 | Amei |
| 2004/0185805 A1 | 9/2004 | Kim et al. |
| 2004/0192369 A1 | 9/2004 | Nilsson |
| 2004/0222848 A1 | 11/2004 | Shih et al. |
| 2004/0235438 A1 | 11/2004 | Quilisch et al. |
| 2005/0017787 A1 | 1/2005 | Kojima |
| 2005/0046507 A1 | 3/2005 | Dent |
| 2005/0064830 A1 | 3/2005 | Grigore |
| 2005/0088237 A1 | 4/2005 | Gamero et al. |
| 2005/0110559 A1 | 5/2005 | Farkas et al. |
| 2005/0134388 A1 | 6/2005 | Jenkins |
| 2005/0136854 A1 | 6/2005 | Akizuki et al. |
| 2005/0136866 A1 | 6/2005 | Dupuis |
| 2005/0168281 A1 | 8/2005 | Nagamori et al. |
| 2005/0200407 A1 | 9/2005 | Arai et al. |
| 2005/0227644 A1 | 10/2005 | Maslennikov et al. |
| 2005/0245214 A1 | 11/2005 | Nakamura et al. |
| 2005/0280471 A1 | 12/2005 | Matsushita et al. |
| 2005/0288052 A1 | 12/2005 | Carter et al. |
| 2005/0289375 A1 | 12/2005 | Ranganathan et al. |
| 2006/0006943 A1 | 1/2006 | Clifton et al. |
| 2006/0017426 A1 | 1/2006 | Yang et al. |
| 2006/0038710 A1 | 2/2006 | Staszewski et al. |
| 2006/0046666 A1 | 3/2006 | Hara et al. |
| 2006/0046668 A1 | 3/2006 | Uratani et al. |
| 2006/0052065 A1 | 3/2006 | Argaman et al. |
| 2006/0067425 A1 | 3/2006 | Windisch |
| 2006/0067426 A1 | 3/2006 | Maltsev et al. |
| 2006/0084398 A1 | 4/2006 | Chmiel et al. |
| 2006/0119331 A1 | 6/2006 | Jacobs et al. |
| 2006/0146956 A1 | 7/2006 | Kim et al. |
| 2006/0221646 A1 | 10/2006 | Ye et al. |
| 2006/0226909 A1 | 10/2006 | Abedinpour et al. |
| 2006/0290444 A1 | 12/2006 | Chen |
| 2006/0293005 A1 | 12/2006 | Hara et al. |
| 2007/0024360 A1 | 2/2007 | Markowski |
| 2007/0026824 A1 | 2/2007 | Ono et al. |
| 2007/0032201 A1 | 2/2007 | Behzad et al. |
| 2007/0069820 A1 | 3/2007 | Hayata et al. |
| 2007/0096806 A1 | 5/2007 | Sorrells et al. |
| 2007/0096810 A1 | 5/2007 | Hageman et al. |
| 2007/0129025 A1 | 6/2007 | Vasa et al. |
| 2007/0146090 A1 | 6/2007 | Carey et al. |
| 2007/0182490 A1 | 8/2007 | Hau et al. |
| 2007/0210776 A1 | 9/2007 | Oka |
| 2007/0222520 A1 | 9/2007 | Inamori et al. |
| 2007/0249300 A1 | 10/2007 | Sorrells et al. |
| 2007/0249304 A1 | 10/2007 | Snelgrove et al. |
| 2007/0281635 A1 | 12/2007 | McCallister et al. |
| 2007/0291873 A1 | 12/2007 | Saito et al. |
| 2008/0003950 A1 | 1/2008 | Haapoja et al. |
| 2008/0008273 A1 | 1/2008 | Kim et al. |
| 2008/0009248 A1 | 1/2008 | Rozenblit et al. |
| 2008/0023825 A1 | 1/2008 | Hebert et al. |
| 2008/0036532 A1 | 2/2008 | Pan |
| 2008/0051044 A1 | 2/2008 | Takehara |
| 2008/0057883 A1 | 3/2008 | Pan |
| 2008/0081572 A1 | 4/2008 | Rofougaran |

(56) References Cited

U.S. PATENT DOCUMENTS

| | | |
|---|---|---|
| 2008/0136559 A1 | 6/2008 | Takahashi et al. |
| 2008/0157732 A1* | 7/2008 | Williams ............... 323/266 |
| 2008/0205547 A1 | 8/2008 | Rofougaran |
| 2008/0233913 A1 | 9/2008 | Sivasubramaniam |
| 2008/0278136 A1 | 11/2008 | Murtojarvi |
| 2008/0278236 A1 | 11/2008 | Seymour |
| 2009/0004981 A1 | 1/2009 | Eliezer et al. |
| 2009/0011787 A1 | 1/2009 | Kikuma |
| 2009/0021302 A1 | 1/2009 | Elia |
| 2009/0059630 A1* | 3/2009 | Williams ............... 363/60 |
| 2009/0068966 A1 | 3/2009 | Drogi et al. |
| 2009/0104900 A1 | 4/2009 | Lee |
| 2009/0115520 A1 | 5/2009 | Ripley et al. |
| 2009/0153250 A1 | 6/2009 | Rofougaran |
| 2009/0163157 A1 | 6/2009 | Zolfaghari |
| 2009/0176464 A1 | 7/2009 | Liang et al. |
| 2009/0191826 A1 | 7/2009 | Takinami et al. |
| 2009/0258611 A1 | 10/2009 | Nakamura et al. |
| 2009/0264091 A1 | 10/2009 | Jensen et al. |
| 2009/0274207 A1 | 11/2009 | O'Keeffe et al. |
| 2009/0285331 A1 | 11/2009 | Sugar et al. |
| 2009/0289719 A1 | 11/2009 | Van Bezooijen et al. |
| 2009/0311980 A1 | 12/2009 | Sjoland |
| 2009/0322304 A1 | 12/2009 | Oraw et al. |
| 2010/0007412 A1 | 1/2010 | Wang et al. |
| 2010/0007414 A1 | 1/2010 | Searle et al. |
| 2010/0007433 A1 | 1/2010 | Jensen |
| 2010/0013548 A1 | 1/2010 | Barrow |
| 2010/0020899 A1 | 1/2010 | Szopko et al. |
| 2010/0027596 A1 | 2/2010 | Bellaouar et al. |
| 2010/0029224 A1 | 2/2010 | Urushihara et al. |
| 2010/0097104 A1 | 4/2010 | Yang et al. |
| 2010/0102789 A1 | 4/2010 | Randall |
| 2010/0109561 A1 | 5/2010 | Chen et al. |
| 2010/0120384 A1 | 5/2010 | Pennec |
| 2010/0120475 A1 | 5/2010 | Taniuchi et al. |
| 2010/0123447 A1 | 5/2010 | Vecera et al. |
| 2010/0127781 A1 | 5/2010 | Inamori et al. |
| 2010/0128689 A1 | 5/2010 | Yoon et al. |
| 2010/0164579 A1 | 7/2010 | Acatrinei |
| 2010/0176869 A1 | 7/2010 | Horie et al. |
| 2010/0181980 A1 | 7/2010 | Richardson |
| 2010/0189042 A1 | 7/2010 | Pan |
| 2010/0222015 A1 | 9/2010 | Shimizu et al. |
| 2010/0233977 A1 | 9/2010 | Minnis et al. |
| 2010/0237944 A1 | 9/2010 | Pierdomenico et al. |
| 2010/0291888 A1 | 11/2010 | Hadjichristos et al. |
| 2010/0295599 A1 | 11/2010 | Uehara et al. |
| 2010/0311362 A1 | 12/2010 | Lee et al. |
| 2011/0018516 A1 | 1/2011 | Notman et al. |
| 2011/0018632 A1 | 1/2011 | Pletcher et al. |
| 2011/0018640 A1 | 1/2011 | Liang et al. |
| 2011/0032030 A1 | 2/2011 | Ripley et al. |
| 2011/0051842 A1 | 3/2011 | van der Heijden et al. |
| 2011/0068768 A1 | 3/2011 | Chen et al. |
| 2011/0068873 A1 | 3/2011 | Alidio et al. |
| 2011/0075772 A1 | 3/2011 | Sethi et al. |
| 2011/0080205 A1 | 4/2011 | Lee |
| 2011/0095735 A1 | 4/2011 | Lin |
| 2011/0123048 A1 | 5/2011 | Wang et al. |
| 2011/0136452 A1 | 6/2011 | Pratt et al. |
| 2011/0181115 A1 | 7/2011 | Ivanov |
| 2011/0298538 A1 | 12/2011 | Andrys et al. |
| 2011/0309884 A1 | 12/2011 | Dishop |
| 2012/0044022 A1 | 2/2012 | Walker et al. |
| 2012/0064953 A1 | 3/2012 | Dagher et al. |
| 2012/0229210 A1 | 9/2012 | Jones et al. |
| 2012/0235736 A1 | 9/2012 | Levesque et al. |
| 2012/0236958 A1 | 9/2012 | Deng et al. |
| 2012/0242413 A1 | 9/2012 | Lesso |
| 2012/0252382 A1 | 10/2012 | Bashir et al. |
| 2013/0005286 A1 | 1/2013 | Chan et al. |
| 2013/0307616 A1 | 11/2013 | Berchtold et al. |
| 2013/0342270 A1 | 12/2013 | Baxter et al. |
| 2013/0344828 A1 | 12/2013 | Baxter et al. |
| 2013/0344833 A1 | 12/2013 | Baxter et al. |

OTHER PUBLICATIONS

Author Unknown, "DC-to-DC Converter Combats EMI," Maxim Integrated Products, Application Note 1077, May 28, 2002, 4 pages, http://www.maxim-ic.com/an1077/.

Bastida, E.M. et al., "Cascadable Monolithic Balanced Amplifiers at Microwave Frequencies," 10th European Microwave Conference, Sep. 8-12, 1980, pp. 603-607, IEEE.

Berretta, G. et al., "A balanced CDMA2000 SiGe HBT load insensitive power amplifier," 2006 IEEE Radio and Wireless Symposium, Jan. 17-19, 2006, pp. 523-526, IEEE.

Grebennikov, A. et al., "High-Efficiency Balanced Switched-Path Monolithic SiGe HBT Power Amplifiers for Wireless Applications," Proceedings of the 2nd European Microwave Integrated Circuits Conference, Oct. 8-10, 2007, pp. 391-394, IEEE.

Grebennikov, A., "Circuit Design Technique for High Efficiency Class F Amplifiers," 2000 IEEE International Microwave Symposium Digest, Jun. 11-16, 2000, pp. 771-774, vol. 2, IEEE.

Kurokawa, K., "Design Theory of Balanced Transistor Amplifiers," Bell System Technical Journal, Oct. 1965, pp. 1675-1698, vol. 44, Bell Labs.

Li, Y. et al., "LTE power amplifier module design: challenges and trends," IEEE International Conference on Solid-State and Integrated Circuit Technology, Nov. 2010, pp. 192-195.

Mandeep, J.S. et al., "A Compact, Balanced Low Noise Amplifier for WiMAX Base Station Applications", Microwave Journal, Nov. 2010, p. 84-92, vol. 53, No. 11, Microwave Journal and Horizon House Publications.

Podcameni, A.B. et al., "An amplifier linearization method based on a quadrature balanced structure," IEEE Transactions on Broadcasting, Jun. 2002, p. 158-162, vol. 48, No. 2, IEEE.

Scuderi, A. et al., "Balanced SiGe PA Module for Multi-Band and Multi-Mode Cellular-Phone Applications," Digest of Technical Papers, 2008 IEEE International Solid-State Circuits Conference, Feb. 3-7, 2008, pp. 572-573, 637, IEEE.

Wang, P. et al., "A 2.4-GHz +25dBm P-1dB linear power amplifier with dynamic bias control in a 65-nm CMOS process," 2008 European Solid-State Circuits Conference, Sep. 15-19, 2008, pp. 490-493.

Zhang, G. et al., "A high performance Balanced Power Amplifier and Its Integration into a Front-end Module at PCS Band," 2007 IEEE Radio Frequency Integrated Circuits Symposium, Jun. 3-5, 2007, p. 251-254, IEEE.

Zhang, G. et al., "Dual mode efficiency enhanced linear power amplifiers using a new balanced structure," 2009 IEEE Radio Frequency Integrated Circuits Symposium, Jun. 7-9, 2009, pp. 245-248, IEEE.

Author Unknown, "MIPI Alliance Specification for RF Front-End Control Interface", Mobile Industry Processor Interface (MIPI) Alliance, Version 1.00.00, May 3, 2010, approved Jul. 16, 2010, 88 pages.

Author Unknown, "SKY77344-21 Power Amplifier Module—Evaluation Information," Skyworks Solutions, Inc., Version -21, Feb. 16, 2010, 21 pages.

Non-Final Office Action for U.S. Appl. No. 11/756,909, mailed May 15, 2009, 11 pages.

Final Office Action for U.S. Appl. No. 11/756,909, mailed Nov. 18, 2009, 14 pages.

Notice of Allowance for U.S. Appl. No. 11/756,909, mailed Dec. 23, 2010, 7 pages.

Non-Final Office Action for U.S. Appl. No. 12/723,738, mailed Dec. 20, 2012, 7 pages.

Quayle Action for U.S. Appl. No. 13/198,074, mailed Jan. 22, 2013, 5 pages.

Notice of Allowance for U.S. Appl. No. 13/090,663, mailed Nov. 28, 2012, 8 pages.

Invitation to Pay Additional Fees and, Where Applicable, Protest Fee for PCT/US2011/050633, mailed Aug. 22, 2012, 5 pages.

Non-Final Office Action for U.S. Appl. No. 13/289,134, mailed Feb. 6, 2013, 13 pages.

Non-Final Office Action for U.S. Appl. No. 13/287,726, mailed Jan. 25, 2013, 11 pages.

(56) References Cited

OTHER PUBLICATIONS

Non-Final Office Action for U.S. Appl. No. 13/287,735, mailed Jan. 25, 2013, 11 pages.
Non-Final Office Action for U.S. Appl. No. 13/288,318, mailed Feb. 5, 2013, 12 pages.
Non-Final Office Action for U.S. Appl. No. 13/288,478, mailed Dec. 26, 2012, 8 pages.
Non-Final Office Action for U.S. Appl. No. 13/288,517, mailed Dec. 11, 2012, 9 pages.
Non-Final Office Action for U.S. Appl. No. 13/288,273, mailed Feb. 5, 2013, 8 pages.
Non-Final Office Action for U.S. Appl. No. 13/304,744, mailed Jan. 24, 2013, 10 pages.
Notice of Allowance for U.S. Appl. No. 13/304,762, mailed Nov. 27, 2012, 7 pages.
Notice of Allowance for U.S. Appl. No. 13/198,074, mailed Apr. 12, 2013, 8 pages.
Non-Final Office Action for U.S. Appl. No. 13/287,726, mailed May 16, 2013, 9 pages.
Non-Final Office Action for U.S. Appl. No. 13/288,517, mailed May 16, 2013, 9 pages.
Non-Final Office Action for U.S. Appl. No. 13/226,843, mailed Mar. 4, 2013, 6 pages.
Non-Final Office Action for U.S. Appl. No. 13/288,373, mailed Feb. 25, 2013, 6 pages.
Non-Final Office Action for U.S. Appl. No. 13/289,379, mailed Feb. 25, 2013, 9 pages.
Non-Final Office Action for U.S. Appl. No. 13/305,763, mailed Mar. 8, 2013, 10 pages.
Notice of Allowance for U.S. Appl. No. 13/304,762, mailed Mar. 5, 2013, 7 pages.
Notice of Allowance for U.S. Appl. No. 13/226,797, mailed Apr. 26, 2013, 8 pages.
International Search Report and Written Opinion for PCT/US2011/050633, mailed Mar. 8, 2013, 23 pages.
International Preliminary Report on Patentability for PCT/US2011/050633, mailed Mar. 28, 2013, 17 pages.
Author Unknown , "SKY77344-21 Power Amplifier Module—Evaluation Information," Skyworks, Version 21, Feb. 16, 2010, 21 pages.
Noriega, Fernando et al., "Designing LC Wilkinson power splitters," RF interconnects/interfaces, Aug. 2002, pp. 18-24, www.rfdesign.com.
Pampichai, Samphan et al., "A 3-dB Lumped-Distributed Miniaturized Wilkinson Divider," Electrical Engineering Conference (EECON-23), Nov. 2000, pp. 329-332.
Non-Final Office Action for U.S. Appl. No. 12/433,377, mailed Jun. 16, 2011, 7 pages.
Notice of Allowance for U.S. Appl. No. 12/433,377, mailed Oct. 31, 2011, 8 pages.
Final Office Action for U.S. Appl. No. 12/774,155, mailed Jan. 31, 2013, 15 pages.
Final Office Action for U.S. Appl. No. 12/774,155, mailed Apr. 18, 2013, 15 pages.
Advisory Action for U.S. Appl. No. 12/774,155, mailed Jun. 4, 2013, 3 pages.
Non-Final Office Action for U.S. Appl. No. 12/774,155, mailed Aug. 15, 2013, 15 pages.
Non-Final Office Action for U.S. Appl. No. 12/749,091, mailed Mar. 25, 2013, 9 pages.
Notice of Allowance for U.S. Appl. No. 12/749,091, mailed May 20, 2013, 9 pages.
Notice of Allowance for U.S. Appl. No. 12/773,292, mailed Feb. 22, 2012, 11 pages.
Notice of Allowance for U.S. Appl. No. 12/773,292, mailed Jul. 16, 2012, 12 pages.
Non-Final Office Action for U.S. Appl. No. 13/019,777, mailed Feb. 19, 2013, 9 pages.
Notice of Allowance for U.S. Appl. No. 13/019,077, mailed May 24, 2013, 9 pages.
Notice of Allowance for U.S. Appl. No. 13/288,273 mailed Oct. 24, 2013 9 pages.
Advisory Action for U.S. Appl. No. 13/288,373, mailed Oct. 15, 2013, 3 pages.
Advisory Action for U.S. Appl. No. 13/304,744, mailed Sep. 13, 2013, 3 pages.
Non-Final Office Action for U.S. Appl. No. 13/304,744, mailed Oct. 21, 2013, 12 pages.
Notice of Allowance for U.S. Appl. No. 13/305,763, mailed Sep. 16, 2013, 6 pages.
Non-Final Office Action for U.S. Appl. No. 13/226,777, mailed Oct. 18, 2013, 10 pages.
Final Office Action for U.S. Appl. No. 13/226,814, mailed Oct. 23, 2013, 21 pages.
Notice of Allowance for U.S. Appl. No. 13/287,726, mailed Oct. 7, 2013, 9 pages.
Advisory Action for U.S. Appl. No. 13/226,843, mailed Sep. 17, 2013, 3 pages.
Non-Final Office Action for U.S. Appl. No. 13/226,843, mailed Oct. 29, 2013, 7 pages.
Non-Final Office Action for U.S. Appl. No. 12/774,155, mailed Dec. 4, 2013, 18 pages.
Final Office Action for U.S. Appl. No. 13/287,713, mailed Dec. 6, 2013, 9 pages.
Notice of Allowance for U.S. Appl. No. 13/288,478, mailed Nov. 18, 2013, 9 pages.
Non-Final Office Action for U.S. Appl. No. 13/288,517, mailed Oct. 31, 2013, 10 pages.
Non-Final Office Action for U.S. Appl. No. 13/288,373, mailed Nov. 19, 2013, 5 pages.
Non-Final Office Action for U.S. Appl. No. 13/288,590, mailed Dec. 5, 2013, 8 pages.
Notice of Allowance for U.S. Appl. No. 13/304,735, mailed Jan. 2, 2014, 8 pages.
Notice of Allowance for U.S. Appl. No. 13/304,796, mailed Dec. 5, 2013, 9 pages.
Notice of Allowance for U.S. Appl. No. 13/304,943, mailed Dec. 5, 2013, 9 pages.
Advisory Action for U.S. Appl. No. 13/226,814, mailed Dec. 31, 2013, 3 pages.
Final Office Action for U.S. Appl. No. 13/479,816, mailed Nov. 1, 2013, 15 pages.
Advisory Action for U.S. Appl. No. 13/479,816, mailed Jan. 7, 2014, 3 pages.
Non-Final Office Action for U.S. Appl. No. 13/656,997, mailed Jan. 13, 2014, 6 pages.
Notice of Allowance for U.S. Appl. No. 13/289,134, mailed Jun. 6, 2013, 8 pages.
Non-Final Office Action for U.S. Appl. No. 13/287,713, mailed Aug. 5, 2013, 7 pages.
Notice of Allowance for U.S. Appl. No. 13/287,735, mailed May 28, 2013, 8 pages.
Non-Final Office Action for U.S. Appl. No. 13/288,318, mailed Jun. 3, 2013, 14 pages.
Non-Final Office Action for U.S. Appl. No. 13/288,478, mailed Jun. 3, 2013, 9 pages.
Final Office Action for U.S. Appl. No. 13/226,843, mailed Jul. 10, 2013, 7 pages.
Non-Final Office Action for U.S. Appl. No. 13/288,273, mailed May 30, 2013, 11 pages.
Final Office Action for U.S. Appl. No. 13/288,373, mailed Aug. 2, 2013, 7 pages.
Notice of Allowance for U.S. Appl. No. 13/289,379, mailed Jun. 6, 2013, 9 pages.
Non-Final Office Action for U.S. Appl. No. 13/304,735, mailed Jul. 11, 2013, 8 pages.
Non-Final Office Action for U.S. Appl. No. 13/304,796, mailed Jul. 17, 2013, 8 pages.
Final Office Action for U.S. Appl. No. 13/304,744, mailed May 30, 2013, 12 pages.
Advisory Action for U.S. Appl. No. 13/304,744, mailed Aug. 2, 2013, 3 pages.

(56) References Cited

OTHER PUBLICATIONS

Final Office Action for U.S. Appl. No. 13/305,763, mailed Jun. 24, 2013, 13 pages.
Non-Final Office Action for U.S. Appl. No. 13/304,943, mailed Jul. 23 2013, 8 pages.
Notice of Allowance for U.S. Appl. No. 13/226,777, mailed May 28, 2013, 8 pages.
Non-Final Office Action for U.S. Appl. No. 13/226,814, mailed Jun. 13, 2013, 13 pages.
Non-Final Office Action for U.S. Appl. No. 13/479,816, mailed Jul. 5, 2013, 13 pages.
Non-Final Office Action for U.S. Appl. No. 12/723,738, mailed Apr. 28, 2014, 14 pages.
Advisory Action for U.S. Appl. No. 13/287,713, mailed Feb. 20, 2014, 4 pages.
Non-Final Office Action for U.S. Appl. No. 13/288,517, mailed Apr. 28, 2014, 10 pages.
Non-Final Office Action for U.S. Appl. No. 13/226,843, mailed Mar. 31, 2014, 7 pages.
Notice of Allowance for U.S. Appl. No. 13/288,273, mailed Apr. 25, 2014, 7 pages.
Notice of Allowance for U.S. Appl. No. 13/288,373, mailed May 7, 2014, 7 pages.
Non-Final Office Action for U.S. Appl. No. 13/288,590, mailed May 8, 2014, 11 pages.
Notice of Allowance for U.S. Appl. No. 13/304,762, mailed Apr. 16, 2014, 7 pages.
Final Office Action for U.S. Appl. No. 13/226,777, mailed Mar. 21, 2014, 13 pages.
Non-Final Office Action for U.S. Appl. No. 13/656,997, mailed Apr. 30, 2014, 8 pages.
Non-Final Office Action for U.S. Appl. No. 12/774,155, mailed Jun. 21, 2012, 13 pages.
Notice of Allowance for U.S. Appl. No. 13/288,318, mailed Oct. 24, 2013, 9 pages.
Notice of Allowance for U.S. Appl. No. 12/774,155, mailed Jun. 20, 2014, 8 pages.
Non-Final Office Action for U.S. Appl. No. 14/010,617, mailed Jul. 16, 2014, 6 pages.
Non-Final Office Action for U.S. Appl. No. 14/010,643, mailed Jul. 18, 2014, 6 pages.
Non-Final Office Action for U.S. Appl. No. 13/172,371, mailed Jun. 16, 2014, 7 pages.
Non-Final Office Action for U.S. Appl. No. 13/289,302, mailed Jun. 16, 2014, 7 pages.
Notice of Allowance for U.S. Appl. No. 13/304,762, mailed May 29, 2014, 7 pages.
Non-Final Office Action for U.S. Appl. No. 13/773,888, mailed Jun. 10, 2014, 15 pages.
Final Office Action for U.S. Appl. No. 12/723,738, mailed Aug. 11, 2014, 10 pages.
Non-Final Office Action for U.S. Appl. No. 14/010,630, mailed Aug. 6, 2014, 7 pages.
Notice of Allowance for U.S. Appl. No. 13/287,726, mailed Aug. 4, 2014, 7 pages.
Non-Final Office Action for U.S. Appl. No. 13/287,672, mailed Jul. 28, 2014, 12 pages.
Notice of Allowance for U.S. Appl. No. 13/288,517, mailed Aug. 15, 2014, 7 pages.

\* cited by examiner

HYBRID DC/DC POWER CONVERTER WITH CHARGE-PUMP AND BUCK CONVERTER

PRIORITY CLAIM

This application claims the benefit of Provisional Patent Application Ser. No. 61/100,197, filed Sep. 25, 2008, the disclosure of which is hereby incorporated herein by reference in its entirety and is hereby made part of this specification.

FIELD OF THE DISCLOSURE

The present disclosure relates to converting power required by electronic systems from one voltage level to another. In particular, the present disclosure relates to a Direct Current (DC) to DC converter having a charge pump converter followed by a buck converter.

BACKGROUND

The amount of time a cellular handset can operate on a fully charged battery is in conflict with the increasing consumer demand for more features and smaller handsets. In an attempt to keep up with the power requirements brought about by these consumer demands, the cellular handset industry has turned to advanced higher capacity lithium ion battery technology. However, a trade-off exists in that an advanced lithium ion battery can be discharged to a lower operating voltage than typical lithium ion batteries. The lower operating voltage is incompatible with existing power amplifier (PA) technology that is used in some of the basic building blocks of cellular handset circuitry. In order to solve this lower voltage incompatibility issue, the cellular handset industry has turned to Direct Current (DC) to DC converter technology to boost the voltage of advanced lithium ion batteries to a level that is compatible with existing PA technology. Moreover, it is widely recognized that DC to DC converter technology is generally much more efficient at regulating output voltage than typical linear voltage regulator technology. Thus, DC to DC converters offer increased efficiency that can provide longer handset operation time or smaller handsets while stepping up the voltage for compatibility with existing PA technology.

Low current voltage boosting is commonly accomplished with a range of charge pump architectures that gradually charge a holding capacitor to twice the input voltage from a source such as a lithium-ion battery. More evolved versions of charge pump architecture can regulate output voltages. However, these evolved versions of charge pump architecture are generally less efficient.

When higher load currents are needed, conventional boost converters that include a power inductor can be used. Inductor based boost converters can produce output voltages that are either equal to or greater than the input voltage. Some architectures, referred to as buck-boost, can generate output voltages that can either be smaller or greater than the input battery voltage. However, the level of ripple or Alternating Current (AC) variation present on the output DC voltage is always too large and causes spectral splatter at the output of the power amplifier. To reduce the level of such ripple beyond what can be done with filtering, the more conventional inductor based boost converter is followed by either an inefficient linear voltage regulator or by a buck regulator. However, even when an inductor based boost regulator is followed by a buck regulator, the overall efficiency is poor because the combined or cascaded efficiency is equal to a multiplication of both the boost and buck efficiencies. Moreover, two power inductors are needed in such architectures, which results in increased design complexity and added expense. As a result, there remains a need for a low cost, small footprint, high efficiency DC to DC converter having an excellent low ripple output voltage.

SUMMARY

The present application discloses a novel hybrid Direct Current (DC) to DC power converter that is constructed from a charge pump circuit and a buck circuit. For the purposes of this disclosure, the novel hybrid DC to DC converter will be referred to as a Charge-Pump Buck (CPB) converter. In its most basic form, the CPB converter has an input node, a charge transfer node, an output node, and a fixed voltage node such as a power or a ground node. A load powered by the CPB converter is connectable between the output node and the ground node. A DC power source such as an electrochemical battery provides electrical energy for powering the load. The DC power source is connectable between the input node and the ground node.

The charge pump circuit of the CPB converter comprises one or more flying capacitors that are selectably connectable to the input node, the charge transfer node, and the ground node by a plurality of electronic switches that are controlled by a switch controller. The buck circuit of the CPB converter comprises a low-pass filter made up of an inductor connected between the charge transfer node and the output node, and a filter capacitor connected between the output node and a fixed voltage node such as power node or a ground node. An electronic switch such as an N Channel Field Effect Transistor (NFET) selectably connects the charge transfer node to the fixed voltage node under the control of the switch controller in order to provide a voltage bucking effect.

In operation of the CPB converter, the charge pump circuit receives an input voltage at the input node and generates a stepped up voltage at the charge transfer node during a connected phase of a charge pump cycle. The connected phase occurs when a flying capacitor is selectably connected to the charge transfer node. A pumping coincides with the connected phase. The pumping phase transfers charge from the flying capacitor to the inductor, the filter capacitor and the load via the charge transfer node. During a floating phase, the flying capacitor is selectably disconnected from the charge transfer node such that the charge pump circuit is substantially isolated from the charge transfer node. The switch controller operationally coupled to the electronic switch between the transfer node and ground closes the switch during at least a portion of the floating phase. Once the switch is closed a magnetic field built up around the inductor during the pumping phase collapses to maintain the voltage level at the output node. A charging phase for charging the flying capacitor commences just after or is coincidental with the floating phase. During the charging phase, the flying capacitor is selectably connected to the input node. Once the flying capacitor is recharged, the flying capacitor is reconnected to the charge transfer node during the connected phase, which repeats a charge pump cycle.

Those skilled in the art will appreciate the scope of the present invention and realize additional aspects thereof after reading the following detailed description of the invention in association with the accompanying drawing figures.

DETAILED DESCRIPTION

The embodiments set forth below represent the necessary information to enable those skilled in the art to practice the invention and illustrate the best mode of practicing the invention. Upon reading the following description in light of the accompanying drawings, those skilled in the art will understand the concepts of the invention and will recognize applications of these concepts not particularly addressed herein. It should be understood that these concepts and applications fall within the scope of the disclosure and accompanying claims.

A Charge Pump Buck (CPB) converter according to the present disclosure is a hybrid architecture that can boost an input voltage while being very efficient. The CPB converter combines features from both a dual phase charge pump and a classical synchronous buck converter. This approach is more efficient and requires only one power inductor when compared to a conventional Direct Current (DC) to DC converter that includes an inductor-based boost converter that is followed by a buck converter. Also, the present CPB converter's design is far simpler than a conventional design since only one closed loop is required, only one power inductor (two flying capacitors are needed), and the output ripple is very close to that of a classical buck converter. The CPB will achieve an overall conversion efficiency of between 85% and 95% under the conditions of typical handset operation.

Figure 1:
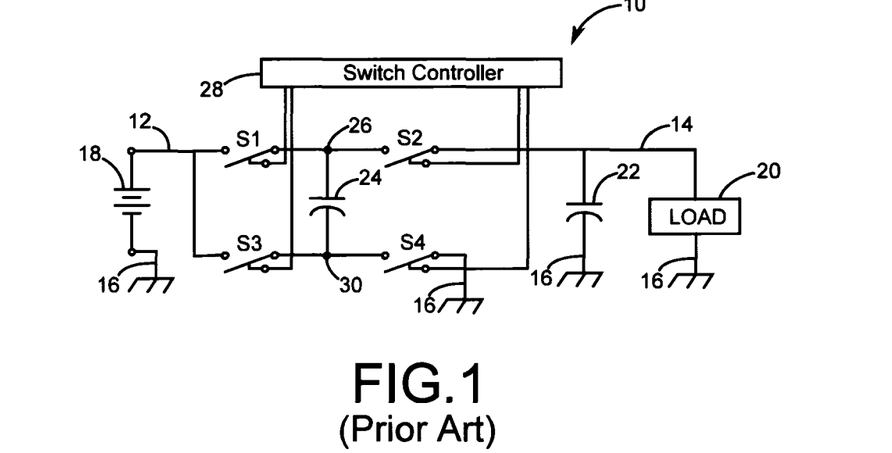
FIG. 1 is a schematic diagram of a prior art single phase charge pump.

Before delving into the present embodiments, a discussion of charge pumps and their operation is provided for context. FIG. 1 depicts a prior art single phase charge pump 10 that has an input node 12, a charge transfer node 14, and a ground node 16. A power source such as a battery 18 is connected between the input node 12 and the ground node 16. A load 20 is connected between the charge transfer node 14 and the ground node 16. A holding capacitor 22 is connected in parallel with the load 20. A flying capacitor 24 has a positive terminal 26 that is alternately switchable between the input node 12 and the charge transfer node 14 by the switches S1 and S2 that are controllable by a switch controller 28. The flying capacitor 24 also has a negative terminal 30 that is alternately switchable between the input node 12 and the ground node 16 by the switches S3 and S4 that are controllable by the switch controller 28.

During a charging phase for the flying capacitor 24, the switch S1 connects the positive terminal 26 of the flying capacitor 24 to the input node 12 while the switch S4 connects the negative terminal 30 of the flying capacitor 24 to the ground node 16. The switches S2 and S3 are open during the charging phase. The flying capacitor 24 is practically charged to the voltage of the battery 18, provided that the charging phase is significantly long.

During a pumping phase, the switches S1 and S4 are opened, and the switches S2 and S3 are closed to connect the negative terminal 30 of the flying capacitor 24 to the input node 12 and the positive terminal 26 of the flying capacitor 24 to the charge transfer node 14. While in the pumping phase, the fully charged flying capacitor 24 and battery 18 combine in series to initially provide the holding capacitor 22 and the load 20 with twice the voltage of the battery 18. The switch controller 28 switches the flying capacitor 24 back to the charging phase after a relatively small charge transfer in order to limit the amount of output ripple voltage present in the output voltage. The switch controller 28 continues to generate switching phase cycles as described above as long as there is a need for the charge pump 10 to transfer charge to the load 20.

Figure 2:
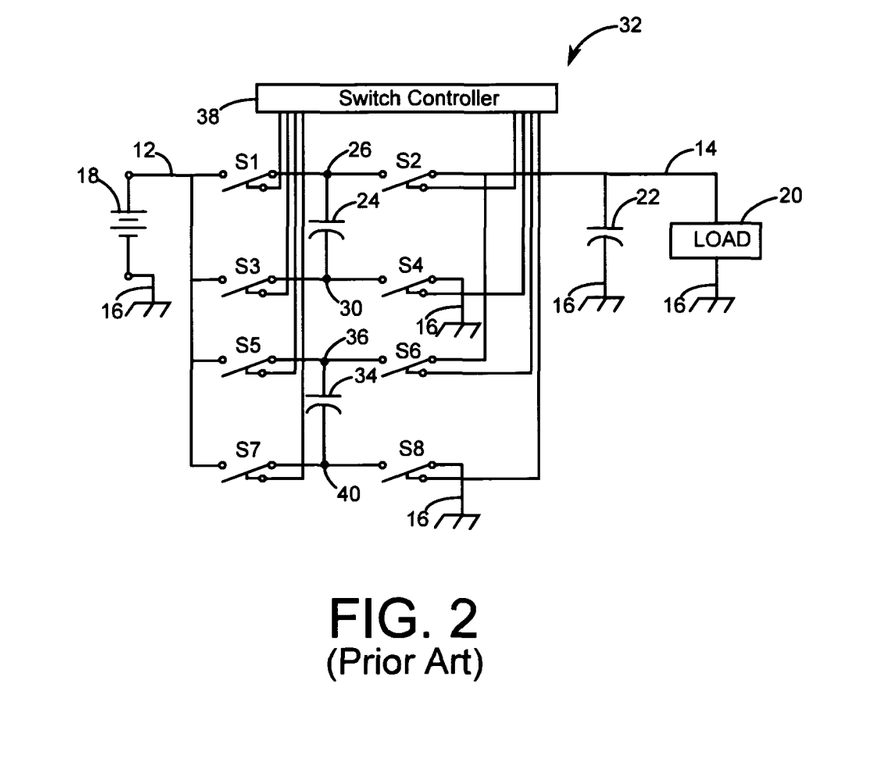
FIG. 2 is a schematic diagram of a prior art dual phase charge pump.

FIG. 2 depicts a prior art dual phase charge pump 32 that is designed to reduce the output ripple voltage by half in comparison with the single phase charge pump 10 of FIG. 1. The dual phase charge pump 32 includes a second flying capacitor 34 that has a positive terminal 36 that is alternately switchable between the input node 12 and the charge transfer node 14 by switches S5 and S6 that are controllable by a switch controller 38. The second flying capacitor 34 also has a negative terminal 40 that is alternately switchable between the input node 12 and the ground node 16 by the switches S7 and S8 that are also controllable by the switch controller 38. This dual phase structure allows for the second flying capacitor 34 to be recharged while the flying capacitor 24 is transferring charge to the holding capacitor 22 and the load 20, and vice versa. As a result of their shared pumping duty, the flying capacitors 24 and 34 continuously maintain a nearly constant load voltage that is practically double that of the voltage of the battery 18.

The operation mode of the charge pump 32 as described above is often called the 2× mode because the output voltage of charge pump 32 is practically twice that of the input voltage. Charge pumps can be operated in modes that convert the input voltage to an output voltage that is less than twice the input voltage. However, the 2× mode yields the maximum conversion efficiency for a charge pump. Therefore, if an output voltage is needed that is less than twice the input voltage while maintaining the efficiency of a 2× mode operated charge pump, an alternate DC to DC converter architecture is needed.

Figure 3:
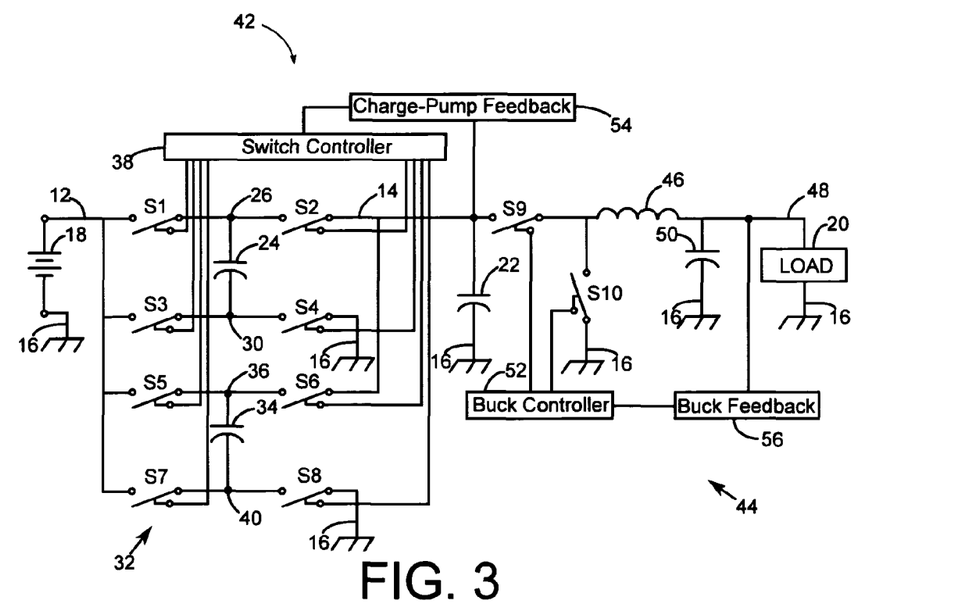
FIG. 3 is schematic diagram of a dual phase charge pump switchably interfaced with a buck converter.

FIG. 3 depicts one embodiment of a hybrid DC to DC converter 42 according to the present disclosure. This embodiment adds a buck circuit 44 between the holding capacitor 22 and the load 20. The buck circuit 44 comprises an inductor 46 that is selectably connectable between the charge transfer node 14 and an output node 48 by a switch S9. A filter capacitor 50 is connected between the output node 48 and the ground node 16. A switch S10 selectably connects the charge transfer node 14 to the ground node 16 under the control of a buck controller 52, which alternately closes and opens the switches S9 and S10 to provide a voltage bucking effect. The inductor 46 and the filter capacitor 50 make a low-pass filter that passes a converted DC voltage to the load 20. The level of DC voltage at the output node 48 is proportional to the amount of time the switch S9 is closed. The maximum level of DC voltage available at the output node 48 occurs when the switch S9 is continuously closed. In contrast, the minimum level of DC voltage available at the output node 48 is zero when the switch S9 is continuously open. The switches S9 and S10 must be opened and closed 180° out of phase with each other in order to prevent shunting the holding capacitor 22 to the ground node 16. It is also important to note that the size of the output ripple voltage is primarily dependent upon the selection of the values of inductance and capacitance for the inductor 46 and the filter capacitor 50, along with the selection of the switching rate for the switches S9 and S10.

The hybrid DC to DC converter 42 of FIG. 3 is a cascade of two independent converter systems, which are the dual phase charge pump 32 followed by the buck circuit 44. The conversion efficiency of the dual phase charge pump 32 is less than 100%, but can exceed 95%. On the other hand, an optimized buck circuit 44 can have conversion efficiencies between 90% and 95%. However, the overall conversion efficiency of the combined converter systems is less than that of either converter system alone. For example, the resulting combined conversion efficiency for the hybrid DC to DC converter 42 of FIG. 3 can be around 85% if the conversion efficiencies of the dual phase charge pump 32 and the buck circuit 44 are 95% and 90%, respectively. While the overall conversion efficiency of the hybrid DC to DC converter 42 of FIG. 3 is good, the overall circuit complexity is less than ideal because it requires two independent controllers, the switch controller 38 for the switches S1-S8 and the buck controller 52 for switches S9 and S10. Moreover, the holding capacitor 22 would be prohibitively large in both capacitance value and physical size. Further still, if voltage regulation is required, a closed feedback loop 54 for the dual phase charge pump 32, and a closed feedback loop 56 for the buck circuit 44 would be necessary.

Figure 4:
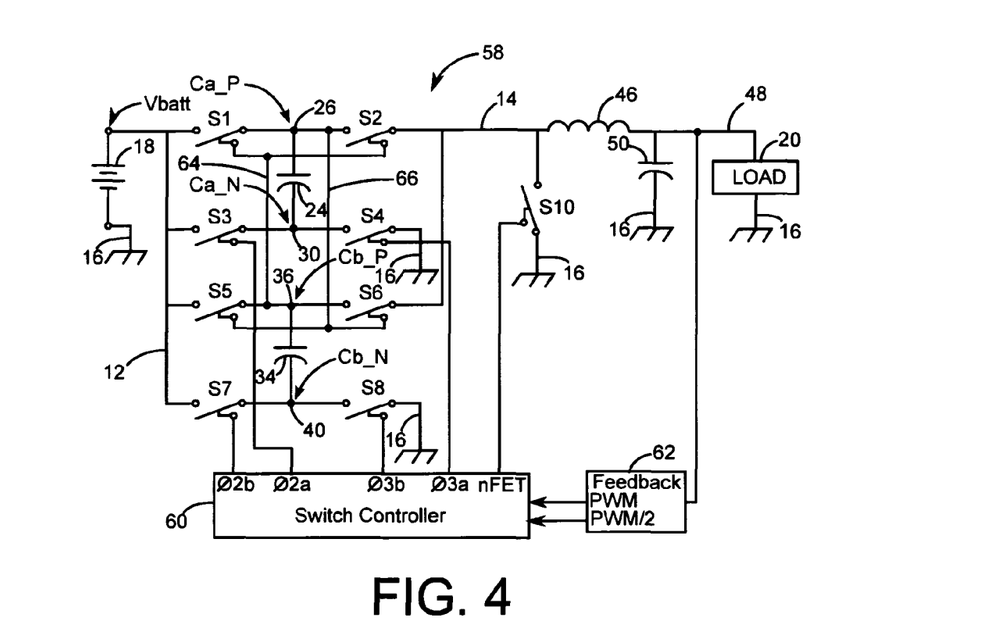
FIG. 4 is a schematic diagram of a Charge-Pump Buck (CPB) converter according to the present disclosure.

As a result of the complexity of the hybrid DC to DC converter 42 of FIG. 3, a less complex and even more efficient converter is desirable. FIG. 4 is a schematic diagram of a preferred hybrid DC to DC converter according to the present disclosure, which will be referred to hereinafter as a CPB converter 58. In this preferred embodiment, the switch S9 and the holding capacitor 22 are not necessary. Moreover, the inductor 46 is continuously connected between the charge transfer node 14 and the output node 48. The need for the holding capacitor 22 and the switch S9 is eliminated by adjusting the phase timing between the charge-pump switches S1-S8 and the switch S10 such that all the charge-pump switches S1-S8 are open during the floating phase while the buck circuit switch S10 is closed to short the charge transfer node 14 to the ground node 16. Only a single switch controller 60 is used with the CPB converter 58 as a result of eliminating the switch S9. Moreover, since there is only one switch controller 60, only one closed feedback loop 62 is needed, if voltage regulation is required. In order to control the level of the output voltage in accordance with a desired output set point, the closed feedback loop 62 varies the duty cycle of switch closures by way of pulse width modulation signals, which are shown as PWM and PWM/2 in the closed feedback loop 62. The signal PWM/2 runs at half the frequency of the PWM signal. Further still, the elimination of the switch S9 simplifies the construction of the CPB converter 58 while at the same time increasing the overall conversion efficiency to around 90%.

The switches S1-S8 and S10 are preferably Complementary Metal Oxide Semiconductor (CMOS) switches. The switches S3, S4, S7, S8 and S10 are preferably driven by gate drivers. Drivers are not needed for the switches S1, S2, S5, and S6 because the higher voltage needed to drive these switches is available at the positive terminals 26 and 36 of the flying capacitors 24 and 34. For example, the switches S1 and S2 are driven by the voltage available at the positive terminal 36 of flying capacitor 34, wherein the voltage is transmitted by a jumper 64. Similarly, the switches S5 and S6 are driven by the voltage available at the positive terminal 26 of flying capacitor 24, wherein the voltage is transmitted by a jumper 66.

Figure 5:
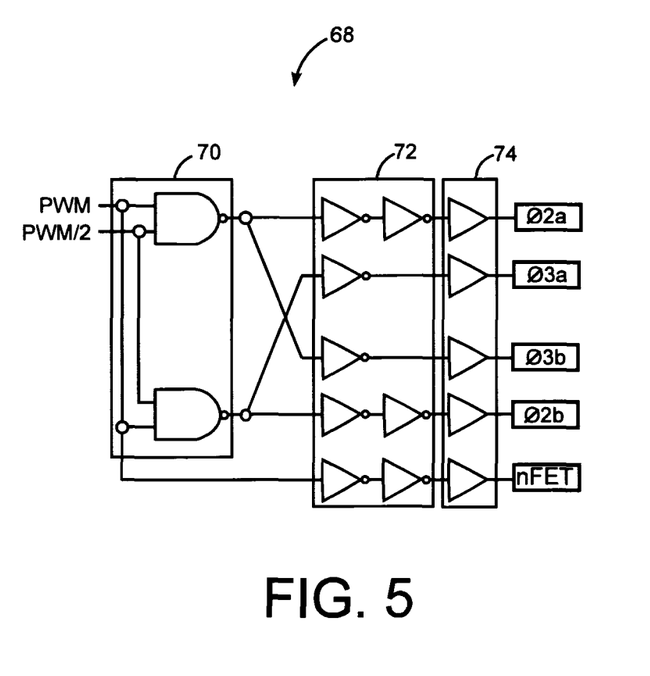
FIG. 5 is a schematic diagram of a logic circuit useable for generating timing signals for a switch controller according to the present disclosure.

FIG. 5 is a schematic of a logic circuit 68 that is useable to generate switch timing signals NFET, Ø2a, Ø2b, Ø3a, and Ø3b, all of which are useable to control the on and off switching of the switches S1-S10. The logic circuit 68 comprises a logic section 70, a delay elements section 72, and a gate drivers section 74. The logic section 70 accepts the PWM and PWM/2 signals from the closed feedback loop 56 shown in FIG. 4. The PWM and PWM/2 signals are processed by the logic circuit 68 to generate the switch timing signals NFET, Ø2a, Ø2b, Ø3a, and Ø3b. The delay elements section 72 insures that the switches S1-S10 are synchronized to prevent inadvertently shorting the battery 18 to the ground node 16. Gate drivers in the gate drivers section 74 provide the higher control voltage needed to activate the switches S3, S4, S7, S8, and S10.

Figure 6:
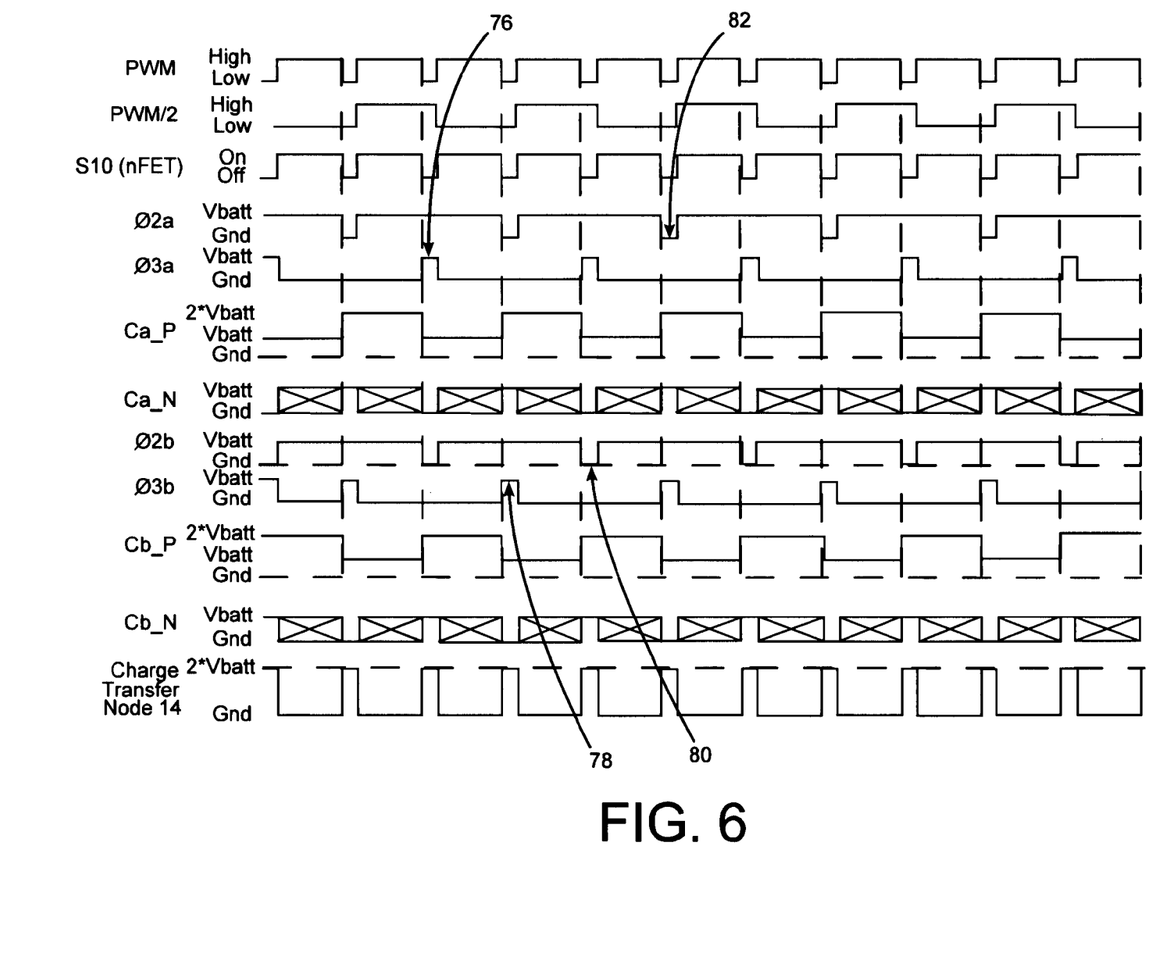
FIG. 6 is a timing diagram showing the relationship between the switch phases while the CPB converter is driven by a 25% duty cycle.

Also, turning now to FIG. 6, a timing diagram is shown representing the timing relationships between the signals depicted in FIG. 5. In this case, a 25% PWM duty cycle results in an output voltage at the load 20 that is about one-half the voltage of the battery 18 of FIG. 4. The timing diagram's crossed out areas for the Ca_N and Cb_N signals (FIG. 4) represent times at which the positive terminals 26 and 36 of the flying capacitors 24 and 34 are floating during the floating phase. An arrow 76 on the timing diagram points to a time when the switch timing signal Ø3a is driven high to close the switch S4 so that the flying capacitor 24 is charged by the voltage of the battery 18 during the charging phase. An arrow 78 points to a time when the switch timing signal Ø3b is driven high to close the switch S8 so that the second flying capacitor 34 is recharged by the voltage of the battery 18. Arrows 80 and 82 indicate that when the switch timing signals Ø2a and Ø2b are low to establish the connected phase, charge is delivered to the charge transfer node 14 during the corresponding pumping phase. At the time indicated by the arrow 80, the switch timing signal Ø2b signal is low, which causes the second flying capacitor 34 to be placed in series with the battery 18, which results in the load 20 having a total applied voltage of the second charged flying capacitor 34 plus the voltage of the battery 18. Similarly, at the time indicated by the arrow 82, the switching timing signal Ø2a is low, which causes the flying capacitor 24 to be placed in series with the battery 18, which results in the load 20 having a total applied voltage of the charged flying capacitor 24 plus the voltage of the battery 18.

Figure 7:
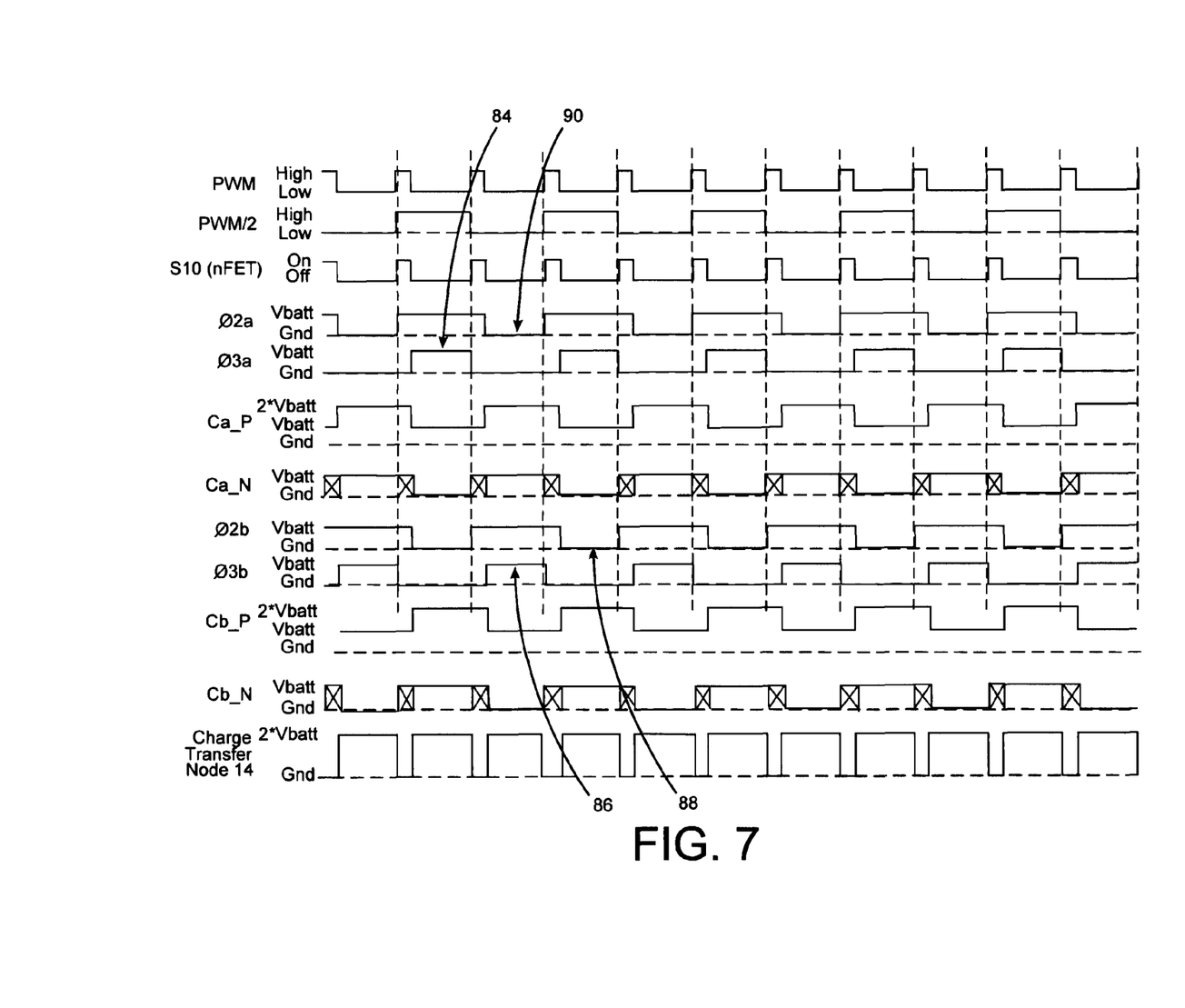
FIG. 7 is a timing diagram showing the relationship between the switch phases while the CPB converter is driven by a 75% duty cycle.

Turning now to FIG. 7, a timing diagram is shown representing the timing relationships between the signals depicted in FIG. 5 for a 75% PWM duty cycle. The timing diagram's crossed out areas of the Ca_N and Cb_N signals (FIG. 4) represent times at which the positive terminals 26 and 36 of the flying capacitors 24 and 34, respectively, are floating during the floating phase. An arrow 84 on the timing diagram of FIG. 7 indicates that when the switch timing signal Ø3a is high, the flying capacitor 24 is being charged by the voltage of the battery 18 (FIG. 4). An arrow 86 indicates that when the switch timing signal Ø3b is high, the flying capacitor 34 is being recharged by the voltage of the battery 18. Arrows 88 and 90 indicate that when the switch timing signals Ø2a and Ø2b are low, charge is delivered to the charge transfer node 14. At either of these times indicated by the arrows 88 and 90, the flying capacitors 24 and 34 are placed in series with the battery 18, which results in the load 20 having a total applied voltage of a charged flying capacitor plus the voltage of the battery 18.

Figure 8:
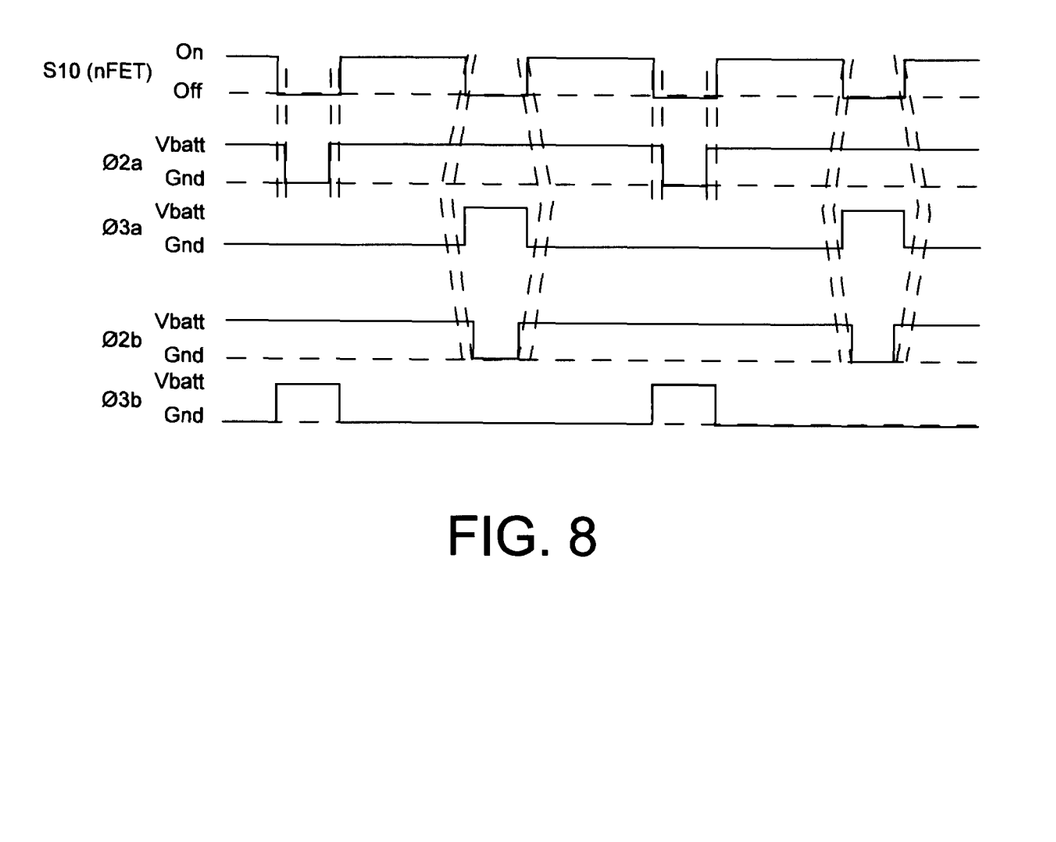
FIG. 8 is a timing diagram that illustrates critical timing transitions.

FIG. 8 is an expanded timing diagram that illustrates the critical timing transitions between the switch S10 (NFET) and the switch timing signals Ø2*a*, Ø2*b*, Ø3*a*, and Ø3*b*. The dashed vertical transition lines indicate that the switch timing signals Ø2*a* and Ø2*b* should be high when the NFET drive signal for the switch S10 goes high. Moreover, the switch timing signals Ø2*a* and Ø2*b* should go low before the NFET drive signal goes low. Fortunately, the timing of the switch timing signals Ø3*a* and Ø3*b* signals is not so critical because the switch timing signals Ø*a* and Ø2*b* are already high at this time. This ensures that the switches S3 and S7 are open, which in turn forces the positive terminals 26 and 36 of the flying capacitors 24 and 34 (FIG. 4), respectively, to float during the floating phase.

Other timing signals can be generated, but careful timing of the switch timing signals Ø3*a* and Ø3*b* would be required. Such careful attention to timing always complicates the design of the CPB converter 58 (FIG. 4) and can affect the overall conversion efficiency, especially if a timing alignment shift occurs because of manufacturing process variations or due to environmental factors such as voltage and temperature.

As illustrated by the timing diagrams of FIGS. 6 and 7, the time allowed to recharge either of the flying capacitors 24 and 34 is about the same time the NFET signal for the switch S10 is high. This means that at a high duty cycle, when higher output voltage is delivered, more charge can be transferred into and out of the flying capacitors 24 and 34. At a low duty cycle there is less time to transfer charge into and out of the flying capacitors 24 and 34. As a result, less current is available to the load 20 when the CPB converter 58 is operated at a low duty cycle. Alternatively, the switch drivers can be re-organized in such a way as to allow higher load current or charge transfers at low output voltage.

Figure 9:
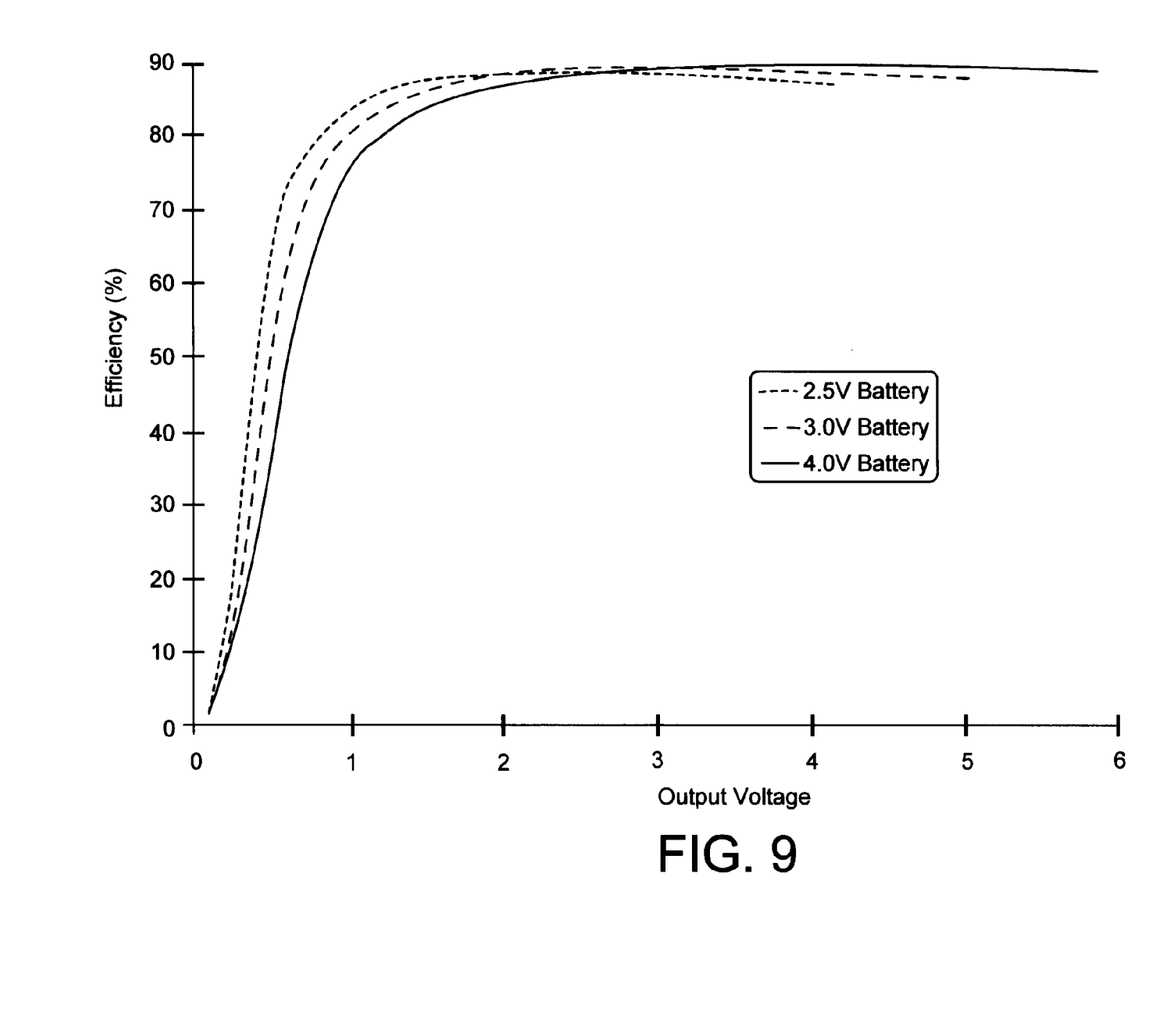
FIG. 9 is a graph of efficiency versus output voltage for three different input voltage levels.

FIG. 9 illustrates the expected efficiency of the CPB converter 58 with the load 20 (FIG. 4) having a resistance of 3.8 ohms. For this particular example, the flying capacitors 24 and 34 and the filter capacitor 50 all have capacitance values of 1 microfarad. The inductor 46 has an inductance value of 1 microhenry with 60 milliohms of effective series resistance. The switches S1-S10 are 55 milliohm power FETs, and the switch controller 60 (FIG. 4) drives the switches S1-S10 at a 2 megahertz switching rate. As shown in FIG. 9, the efficiency is expected to hit 90% at the 4.8 volt output with a 3.6 volt input, which compares to about 70% to 75% for typical cascaded boost and buck converters operated under the same conditions and ripple requirement.

Figure 10:
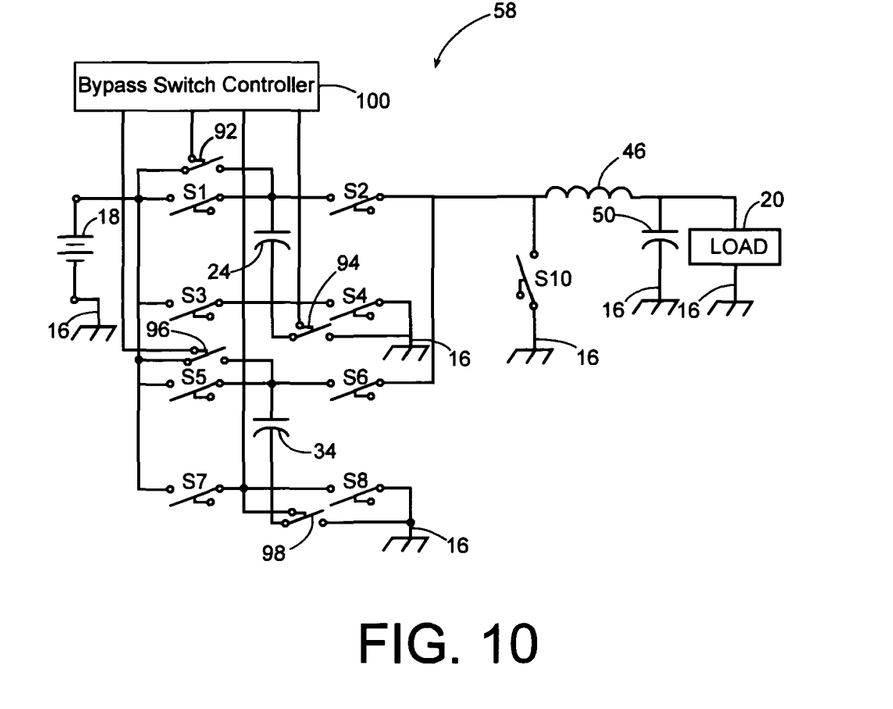
FIG. 10 is a schematic diagram of the CPB converter including a bypass switch controller and bypass switches that are usable to pre-charge the flying capacitors.

FIG. 10 is a schematic of the CPB converter 58 including bypass switches 92, 94, 96, and 98 for pre-charging the flying capacitors 24 and 34. A bypass switch controller 100 closes the bypass switches 92, 94, 96, and 98 when the CPB converter 58 is not supplying power to the load 20. It is preferred that the bypass switches 92, 94, 96, and 98 be FET switches that are sized to minimize the space they need on an integrated circuit die that holds the integrated components of the CPB converter 58. The remaining components preferred for integration are the switches S1-S10 and the switch controller 60, which includes the logic circuit 68. The flying capacitors 24 and 34, the filter capacitor 50, and the inductor 46 are preferably external to the integrated circuit die due to their physical size.

Those skilled in the art will recognize improvements and modifications to the present invention. All such improvements and modifications are considered within the scope of the concepts disclosed herein.

What is claimed is:

1. Charge pump circuitry comprising:
a first switch coupling an input node and a first node;
a second switch coupling the first node and a charge transfer node;
a third switch coupling the input node and a second node;
a fourth switch coupling the second node and a fixed voltage node;
a fifth switch coupling the input node and a third node;
a sixth switch coupling the third node to the charge transfer node;
a seventh switch coupling the input node to a fourth node;
an eighth switch coupling the fourth node to the fixed voltage node;
a first flying capacitor coupling the first node and the second node;
a second flying capacitor coupling the third node to the fourth node, and
wherein the first switch and the second switch are configured to be directly controlled by a third node voltage from the third node.

2. The charge pump circuitry of claim 1, wherein the fifth switch and the sixth switch are configured to be directly controlled by a first node voltage from the first node.

3. The charge pump circuitry of claim 2, wherein the third switch, the fourth switch, the seventh switch, and the eighth switch are configured to be controlled by control circuitry.

4. The charge pump circuitry of claim 2, wherein the third switch, the fourth switch, the seventh switch, and the eight switch are each independently controlled by the control circuitry.

5. The charge pump circuitry of claim 2, further comprising:
a buck circuit coupling the charge transfer node to an output node.

6. Charge pump circuitry comprising:
a first switch coupling an input node and a first node;
a second switch coupling the first node and a charge transfer node;
a third switch coupling the input node and a second node;
a fourth switch coupling the second node and a fixed voltage node;
a fifth switch coupling the input node and a third node;
a sixth switch coupling the third node to the charge transfer node;
a seventh switch coupling the input node to a fourth node;
an eighth switch coupling the fourth node to the fixed voltage node;
a first flying capacitor coupling the first node and the second node;
a second flying capacitor coupling the third node to the fourth node, and
wherein the fifth switch and the sixth switch are configured to be directly controlled by a first node voltage from the first node.

7. Charge pump circuitry comprising:
a first switch coupling an input node and a first node;
a second switch coupling the first node and a charge transfer node;
a third switch coupling the input node and a second node;
a fourth switch coupling the second node and a fixed voltage node;
a fifth switch coupling the input node and a third node;
a sixth switch coupling the third node to the charge transfer node;
a seventh switch coupling the input node to a fourth node;

an eighth switch coupling the fourth node to the fixed voltage node;
a first flying capacitor coupling the first node and the second node;
a second flying capacitor coupling the third node to the fourth node, and
wherein at least one of the switches is configured to be directly controlled by one of the nodes coupled to one of the flying capacitors.

\* \* \* \* \*